United States Patent
Garg

(10) Patent No.: US 9,370,038 B2
(45) Date of Patent: Jun. 14, 2016

(54) SYSTEM AND METHOD FOR INTELLIGENT REDIAL

(71) Applicant: 8318808 Canada Inc., Milton (CA)

(72) Inventor: Neeraj Garg, Milton (CA)

(73) Assignee: 8318808 Canada Inc., Milton (CA)

( * ) Notice: Subject to any disclaimer, the term of this patent is extended or adjusted under 35 U.S.C. 154(b) by 0 days.

(21) Appl. No.: 14/497,176

(22) Filed: Sep. 25, 2014

(65) Prior Publication Data

US 2016/0095155 A1 Mar. 31, 2016

(51) Int. Cl.
*H04M 3/42* (2006.01)
*H04W 76/02* (2009.01)

(52) U.S. Cl.
CPC ........ *H04W 76/028* (2013.01); *H04M 3/42246* (2013.01); *H04W 76/021* (2013.01)

(58) Field of Classification Search
None
See application file for complete search history.

(56) References Cited

U.S. PATENT DOCUMENTS

2010/0124905 A1* 5/2010 Pratt ...................... H04L 51/14
455/412.1
2012/0158751 A1* 6/2012 Tseng ..................... G06Q 30/02
707/751

* cited by examiner

*Primary Examiner* — Vladimir Magloire
*Assistant Examiner* — Sayed T Zewari
(74) *Attorney, Agent, or Firm* — Anil Bhole; Bhole IP Law

(57) ABSTRACT

A system for intelligent redial on computing devices. More specifically, a system for identifying the ideal subsequent recipient to a prior attempt to connect with a recipient.

20 Claims, 3 Drawing Sheets

SYSTEM AND METHOD FOR INTELLIGENT REDIAL

TECHNICAL FIELD

The following relates generally to establishing communication connectivity between two persons. More specifically, the following relates to establishing communication between two persons when a selected method of communication is unsuccessful.

BACKGROUND

Many individuals have more than one telephone number, email address, instant messaging identifier and other communication identifier (ID). Quite commonly, a user or the sender of a communication will unsuccessfully attempt to connect with a recipient using one or more such identifiers. This commonly occurs with telephone communication; however, failure to connect via email is also common due to invalid email addresses or out-of-office settings. For example, a sender may fail to connect with a recipient via a home phone number and will have to spend time locating alternative phone numbers or email addresses to make subsequent attempts to reach that recipient.

When a sender unsuccessfully attempts to communicate with a recipient, most commonly by phone, most existing redial options generally redial the same phone number that was previously attempted. Selecting another number is generally a long process whereby the sender must: (a) exit the existing ID screen for the recipient; (b) find and select another ID for the recipient; and (c) re-perform the previous steps to attempt to establish a connection. Further, manual selection of another ID may not result in the best choice for desired connection due to timing, invalid numbers or emails, etc.

An issue with existing redial methods is that it is time consuming for the sender to connect with recipients. In addition, existing redial methods lack a systematic approach to reaching or connecting with a recipient.

SUMMARY

In one aspect, a system for intelligent redial on a computing device is provided, the computing device comprising a processor and memory, the memory storing computer instructions which when executed by the processor cause the processor to provide an intelligent redial application, the computing device further in network communication with one or more additional computing devices, the intelligent redial application configured to communicate a failed attempt at connection with a recipient, the intelligent redial application further configured to communicate ideal connection paths to a user interface on which a sender may provide instructions regarding a subsequent connection approach, the intelligent redial application further configured to execute on instructions provided by the sender.

In another aspect, a system for intelligent redial on a computing device is provided, the computing device comprising a processor and memory, the memory storing computer instructions which when executed by the processor cause the processor to provide an intelligent redial application, the computing device further in network communication with one or more additional computing devices, the intelligent redial application configured to determine ideal connection paths, the intelligent redial application further configured to execute ideal connection paths automatically.

In still another aspect, a method for intelligent redial on a computing device is provided, the computing device comprising a processor and memory, the memory storing computer instructions which when executed by the processor cause the processor to communicate with one or more additional computing devices, the method comprising: receiving a notification that connection was not established from at least one additional computing device in network communication with the computing device, the at least one additional computing device corresponding to at least one recipient; enabling a sender of the computing device to selectively approve of attempting subsequent communication to the at computing device; and attempting connection with the at least one additional computing device corresponding to recipients for which a sender of the computing device has approved for the subsequent communication to be sent.

In still another aspect, a method for intelligent redial on a computing device is provided, the computing device comprising a processor and memory, the memory storing computer instructions which when executed by the processor cause the processor to communicate with one or more additional computing devices, the method comprising: receiving a notification that connection was not established with at least one additional computing device in network communication with the computing device, the at least one additional computing device corresponding to at least one recipient; enabling an intelligent redial application attempting subsequent connection with the at least one additional computing device; and attempting connection with the at least one additional computing device corresponding to recipient details stored on the computing device.

In yet another aspect, a system for establishing a communication connection between a sender and a recipient is provided, the system comprising an intelligent redial application accessible on a computing device, the computing device comprising a processor and memory, the memory storing computer instructions which when executed by the processor cause the processor to: (a) associate one or more recipient details with each of plurality of recipients, the recipient details defining modes of establishing a communications connection with the respective recipient; (b) determine an order of the recipient details by which to attempt to establish communications between the sender and the respective recipient; and (c) attempt to establish communications between the sender and the respective recipient by selecting, in order, the recipient details for the recipient and attempting to establish communications with the recipient by the selected recipient details, and iteratively reverting to the next recipient details in the order until communications is established.

In a still further aspect, a method for establishing a communication connection between a sender and a recipient using an intelligent redial application accessible on a computing device, the computing device comprising a processor and memory, the memory storing computer instructions which when executed by the processor cause the processor to: (a) associate one or more recipient details with each of plurality of recipients, the recipient details defining modes of establishing a communications connection with the respective recipient; (b) determine an order of the recipient details by which to attempt to establish communications between the sender and the respective recipient; and (c) attempt to establish communications between the sender and the respective recipient by selecting, in order, the recipient details for the recipient and attempting to establish communications with the recipient by the selected recipient details, and iteratively reverting to the next recipient details in the order until communications is established.

BRIEF DESCRIPTION OF THE DRAWINGS

The features of the invention will become more apparent in the following detailed description in which reference is made to the appended drawings wherein.

DETAILED DESCRIPTION

Figure 1:
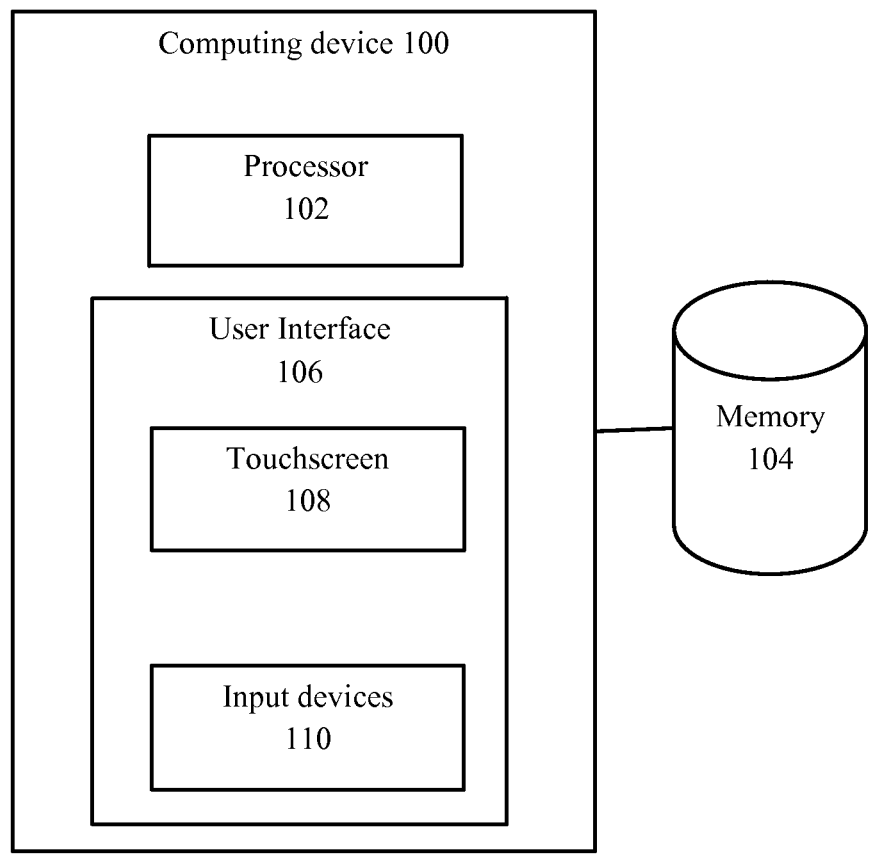
FIG. 1 is an architecture diagram of a system for intelligent redial.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth to provide a thorough understanding of the embodiments described herein. However, it will be understood by those of ordinary skill in the art that the embodiments described herein may be practised without these specific details. In other instances, well-known methods, procedures, and components have not been described in detail so as not to obscure the embodiments described herein. Also, the description is not to be considered as limiting the scope of the embodiments described herein.

It will also be appreciated that any engine, unit, module, component, server, computer, terminal or device exemplified herein that executes instructions may include or otherwise have access to computer readable media, such as, for example, storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as, for example, computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using one or more processors, computer readable media and computer readable/executable instructions that may be stored or otherwise held by such computer readable media and executed by the one or more processors.

The following provides a system and method for intelligent redial. The system comprises an intelligent redial application or service executable or accessible on a computing device. Many individuals have more than one telephone number, email address, instant messaging identifier and other communication ID. Quite commonly, a sender will unsuccessfully attempt to connect with a recipient using one or more such IDs. A sender may update her contact information locally, using a contact management application on a computing device, or via a contact management service available as a cloud service. The contact information is used to attempt to communicate with a recipient and comprises recipient IDs.

An illustrative embodiment comprises a plurality of definitions for determining that a connection has been made depending on the method used to establish communication. For example, when attempting connection via telephone, connection may be defined as being able to speak with or hear the recipient in real time and, conversely, failure of connection may defined as when a busy tone or notification of a disconnected phone is received, or voicemail is reached by the sender attempting connection. When attempting connection via email or short messaging service (SMS), connection may be defined as an email or SMS being received by the recipient and, conversely, failure of connection as the recipient not having received the email or SMS due to a message delivery failure, notification of a disconnected number or out-of-office notification.

In the following, "sender" refers to any person who desires to connect with a recipient; "recipient" refers to any individual the sender has recipient IDs for; "contact information" refers to all aspects of recipient IDs including, but not limited to, phone number, fax number, email address, instant messaging ID, proprietary messaging medium ID, social network ID, etc. for the recipient; and "recipient detail" refers to one specific contact information ID including, but not limited to, one phone number, one fax number, one email address, one instant messaging ID, one proprietary messaging medium ID, one social network ID, etc.

It will be appreciated that several approaches for enabling a sender to select a first item of recipient detail for a recipient are provided in the art. These include typical "address book" applications and services accessible via mobile phone devices.

In the present disclosure, a sender may provide instructions to an address book, or an application that utilizes an address book, or the like to initiate communication with a recipient. As provided herein, the user selects a recipient listed in the address book. The intelligent redial application subsequently determines a medium of communication with the recipient by selecting one or an ordered list of one or more recipient details for the recipient and causes the sender's device to address any communication to the recipient at the first recipient detail. The intelligent redial application initiates communication using one of the recipient details as determined by the order. Once the sender has transmitted the communication to the recipient at the first recipient detail, the intelligent redial application determines whether the communication has been received by the recipient. In the case that communication failed between the sender and the recipient, the intelligent redial application may either suggest to the sender a subsequent recipient detail to reinitiate communication with the recipient, automatically select a subsequent recipient detail to reinitiate communication with the recipient, or present a plurality of recipient detail options to the user to enable sender selection of one recipient detail to reinitiate communication with the recipient.

Referring first to FIG. 1, an exemplary intelligent redial application is illustrated as executable upon a computing device (100). The computing device (100) may be, for example, a PC, laptop, tablet, smartphone or other device having a processor (102) and memory (104), the memory (104) having stored thereon computer instructions which when executed by the processor (102) cause the following operations to be performed. The intelligent redial application further stores and retrieves contact information and recipient clusters to the memory (104).

A recipient cluster is a collection of data including connection and communication attempt information, recipient tendencies, and rules for ideal connection paths, and may be continuously updated by the intelligent redial application. The intelligent redial application may update the recipient cluster based on successful or failed attempts at connection or communication. Updating may comprise storing: time of attempted communication, reason for failed attempted communication, recipient detail used for successful communication attempt, etc. For example, details stored in the recipient cluster may include for a specific recipient (a) the number of recipient details stored for that recipient and the types of recipient detail; (b) the time zone and area code associated to each recipient detail; (c) any indications as to whether the recipient detail is for home, work, mobile, etc.; (d) schedule information related to a recipient; (e) history of any reasons for which any of the recipient details were not able to be reached in prior attempts, etc.

In further embodiments, the recipient cluster may include data attached to specific recipient details. For example, details stored in the recipient cluster may include for a specific recipient detail (a) the phone number is for a home, (b) the home phone number was tried at 5:00 pm and during regular office hours, (c) the phone number has been successfully connected with 4 times out of 8 attempts, etc.

In still further embodiments, the recipient cluster may include social relationship contact data for specific recipients as another way to reach a recipient may be by attempting to connect with the spouse, child, parent, administrative assistant, employment head office, etc. For example, details stored in the recipient cluster may include for a specific recipient (a) the phone number of their spouse, (b) the phone number of their administrative assistant, (c) the phone number of their business partner, etc. Alternatively, the intelligent redial application may be linked by network to one or more social networks from which the application can determine other contacts with which the recipient is related socially, and can attempt to contact socially related persons as a proxy for contacting the intended recipient.

In an aspect, the recipient cluster may be populated with social relationship contact data collected from social media or public data sources. When social relationship contact data is unavailable for a given recipient, the system may search for various relationships online. For example, in attempting to communicate with the recipient, the system may search social networks to determine who is the spouse, child, parent, administrative assistant, employment head office, etc., of the client. Upon obtaining this information, the application may either (a) determine that it has a recipient cluster for that person; (b) establish a recipient cluster for that person and link the original recipient's cluster to this recipient cluster; or (c) add the person's contact detail to the original recipient's cluster. Relationships and details such as phone number, social media handle, address, etc. may be extracted from online sources employing natural language processing rules.

In a further aspect, each social relationship contact may be extracted from the recipient cluster and stored as an individual recipient in the sender's address book. Furthermore, where a sender has recipient details for two distinct recipients, the system may populate the respective recipient cluster with relationship contact data obtainable from online sources. For example, where the sender attempts to communicate with recipient A, the system may identify that recipient A is married to recipient B, for which the sender may or may not have recipient details for. The system may either populate recipient details for recipient B using data found online or may already be in possession of recipient details for recipient B and automatically attempt to communicate with them upon failing to communicate with recipient A.

The recipient cluster may include an indication as to the time of day the social relationship contact may be with or in communication with the recipient. Like recipient details, social relationship contact data may include details such as the best contact details to use for the social relationship contact based on time of day or day of the week, etc.

Social relationship contacts may be stored in levels depending on how closely related the social relationship contact is to the intended recipient. For example, where the intended communication is for business purposes, the first and closest level to the intended recipient may include the administrative assistant or business partner of the recipient. Similarly, a second level to the intended recipient may include the spouse of the administrative assistant or the spouse of the business partner of the recipient. In a further example, where the intended communication is for social purposes, the first and closest level to the intended recipient may include spouse or sibling of the recipient, whereas, the second level to the intended recipient may include the administrative assistant of the spouse or the spouse of the sibling. It will be appreciated that the examples of relationships mentioned herein are for illustrative purposes alone and may be substituted with any other type of relationship appropriate for attempting communication with the recipient. In another example, where the intended communication is to establish communication with the recipient as soon as possible, the appropriate social relationship contact may be selected based on level and time or day. Levels may be configured by the sender or automatically implemented by rules for ideal connection paths.

In further embodiments, the intelligent redial application may continuously re-order the recipient details in the recipient cluster to determine the ideal order for attempting communication. The intelligent redial application allocates a score for how likely it will be to reach the recipient detail based on the time of day, past connection attempt history, etc. As these scores will change based on the factors known, available and relevant at given times on given days, the application may re-order recipient details in real-time.

The computing device (100) further comprises a user interface (106) comprising an input device (110) such as a keyboard, mouse, speaker, or touchscreen and an output device (108) such as a monitor or other display, for example a touchscreen.

The intelligent redial application enables the sender to (a) attempt to connect with a recipient across a plurality of communications platforms using an intelligent redial application interface, which enables the sender to select from contact information including a plurality of phone numbers, email addresses, instant messaging addresses, fax numbers, social media handles, website addresses, etc.; (b) receive notification of the outcome of attempted connection; and (c) select or provide instructions to attempt another connection approach when the prior attempt has failed.

The intelligent redial application exchanges communication requests and approvals by communicating via a network connection, such as the internet, with corresponding contact management applications or message composition applications, each of which may operate a respective contact management application or message composition application providing similar functionality. Communication between senders and recipients may be accomplished via peer-to-peer communication between their respective computing devices and/or specifically via their respective intelligent redial applications, or through a hosted communication exchange (e.g., through a server). Alternatively, communication may be enabled via SMS, preferably equipped with code exchange for authentication, including by a public or private key infrastructure. In embodiments where a server host is used, the server may provide caching and/or scheduled delivery of updates and requests, for example for load balancing or in cases where the target computing device is not available/online.

Alternatively, intelligent redial may be provided via an intelligent redial service hosted in the cloud. Communications in this embodiment can be handled by any protocol, including proprietary, operative on the service.

Figure 2:
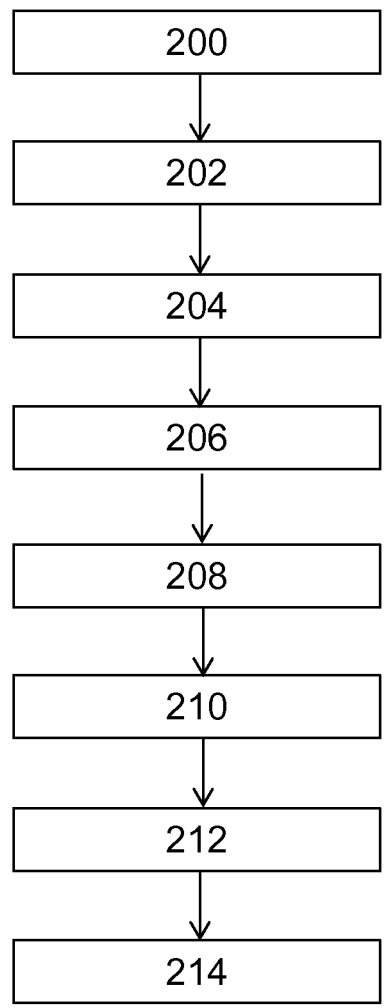
FIG. 2 is a flowchart depicting a method for intelligent redial.

Referring now to FIG. 2, an exemplary workflow for intelligent redial information is provided. In block 200, a sender has accessed their intelligent redial service and selected a recipient to attempt to establish a connection with.

In block 202, the sender may further initiate a request to communicate with her recipient using recipient detail A. In block 204, the intelligent redial application attempts to establish connection with the recipient's device. In block 206 a message may be generated by the recipient identifying that connection was not established using recipient detail A. The failed attempt is stored in memory as part of the recipient cluster indicating that the recipient detail A has failed for connection at that time 208. In further embodiments, where an attempt is successful, it will be stored as part of the recipient cluster corresponding to the relevant recipient detail.

In further embodiments, rather than the sender initiate a request to attempt to establish a connection with her recipient using recipient detail A, as in block 202, the sender may simply specify the recipient and the intelligent redial application may automatically select recipient detail A from the recipient cluster.

In embodiments, the sender may configure whether they would like communication attempts to be made exclusively through telephone, email, SMS or a combination thereof. The intelligent redial application stores the preference by adding it to the recipient cluster.

In further embodiments, the sender may configure whether communication attempts should include social relationship contact data for specific recipients as well as how many levels of social relationship contact data should be included in order to attempt communication. The sender may also configure which specific social relationship contacts should be attempted to make communication with the recipient.

In block 210, the sender's intelligent redial application presents the sender via the output device with a prompt to either cease attempting connection or continue attempting to connect with the recipient. If the sender approves the continuance, the recipient cluster stored in memory is accessed by the intelligent redial application 212, recipient detail B is suggested to the sender 214 and blocks 204-210 are to be repeated.

In still further embodiments, rather than using the intelligent redial application to attempt connection with recipient detail B, the sender may manually select the subsequent recipient detail to use for attempted connection.

A sender may initiate communication or approve continuance by communicating with the user interface verbally, through a touch screen interface, or any other means of input supported by the user input device. The sender may verbally communicate by speaking. For example the sender may say "Retry same recipient detail", "Try suggested recipient detail", "Try home", "Try work", "Try email", "Try text", etc. In still further embodiments, the sender may select from a menu presented to the sender on the user interface using touch or other sensory commands. In still further embodiments, the intelligent redial application may be configured to include smart press commands. In aspects, a letter, numeral, or combination of letters and/or numerals may be configured to initiate communication or approve continuation when said letter, number or combination is selected. For example, the sender selecting "R" on the keypad may retry the same recipient detail, "RM" may attempt to establish a connection with the recipient mobile, "RH" may attempt to establish a connection with the recipient home, etc.

In further embodiments, the sender may configure the order in which they would like to attempt connection for a given recipient. At any time, the sender may provide instructions to the intelligent redial application using the user interface indicating the order in which a recipient's recipient details should be attempted. For example, the sender may give the following voice command: "Call Bob at home then work, then work email, then home email, then text, then Facebook chat."

In further embodiments, the recipient may configure the order in which they would like to be reached using a contact management system. The recipient may communicate a preferred order to through any of the computing device connections mentioned above.

In further embodiments, the sender may configure the intelligent redial application to perform the redial automatically and continuously. The sender may provide instructions to the intelligent redial application using the user interface to continuously attempt to establish a connection with a recipient indefinitely or until the sender provides a stop command.

It will be appreciated that a sender may use the intelligent redial application to attempt connection with a single recipient or a plurality of recipients where such connection is supported by the method of communication. For example, if attempting a conference call, a sender may attempt to establish a connection with a plurality of recipients and each may be intelligently redialed. In a further example, an email or group SMS may make use of the aforementioned batch communication method.

Figure 3:
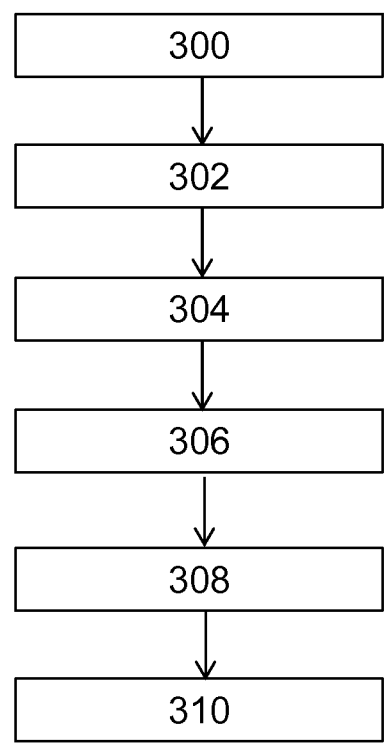
FIG. 3 is a flowchart depicting intelligent redial.

Referring now to FIG. 3, an illustrative embodiment of a system whereby the sender has configured the intelligent redial application to perform the redial automatically is presented.

In block 300, the intelligent redial application may be instructed to attempt to establish a connection with recipient A or a plurality of recipients. In block 302, the intelligent redial application accesses the recipient cluster for that recipient. In block 304, the intelligent redial application selects the ideal recipient detail to attempt first based on the recipient cluster ordering at that moment. In block 306, intelligent redial application communicates with the computing device belonging to recipient detail A. In block 308, the intelligent redial application receives a notification that a connection has not been made. In block 310, the intelligent redial application selects a subsequent recipient detail to attempt.

In block 310, the intelligent redial application updates the recipient cluster as described in more detail above.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

I claim:

1. A system for establishing a communication connection between a sender and a recipient, the system comprising an intelligent redial application accessible on a computing device, the computing device comprising a processor and memory, the memory storing computer instructions which when executed by the processor cause the processor to:

a. associate one or more recipient details with each of a plurality of recipients, the recipient details defining modes of establishing a communications connection with each recipient of the plurality of recipients;

b. generate a recipient cluster comprising, for the respective recipient of the sender, information relating to the success and failure of attempted communications in association with each of the recipient details, and time of attempted communications;

c. allocate a score to each of the recipient details for the respective recipient, the score indicating a likelihood of establishing communications with the recipient detail based on the recipient cluster and a time of day of the communication;

d. determine an order of the recipient details by which to attempt to establish communications between the sender and the respective recipient based on the scores; and e. attempt to establish communications between the sender and the respective recipient by selecting, in order, the recipient details for the recipient and attempting to establish communications with the recipient by the selected recipient details, and f. iteratively reverting to the next recipient details in the order until communications is established.

2. The system of claim 1, wherein the recipient details are stored in an address book accessible by the computing device.

3. The system of claim 1, wherein the intelligent redial application requests confirmation from the sender before establishing communications using each of the recipient details for the recipient.

4. The system of claim 1, wherein the recipient details are linked to social relationship contact data relating to other recipients.

5. The system of claim 4, wherein upon failure to establish communications with the recipient, the intelligent redial application reverts to recipient details for socially related other recipients for the recipient.

6. The system of claim 5, wherein the social relationship contact data is stored in levels for the recipient depending upon how closely related the social relationship contact is to the recipient, and wherein the processor is further configured to determine the order according to the levels for socially related other recipients.

7. The system of claim 1, wherein the intelligent redial application enables the sender to configure the order.

8. A method for establishing a communication connection between a sender and a recipient using an intelligent redial application accessible on a computing device, the computing device comprising a processor and memory, the memory storing computer instructions which when executed by the processor cause the processor to:

a. associate one or more recipient details with each of a plurality of recipients, the recipient details defining modes of establishing a communications connection with each recipient of the plurality of recipients;

b. generate a recipient cluster comprising, for the respective recipient of the sender, information relating to the success and failure of attempted communications in association with each of the recipient details, and time of attempted communications;

c. allocate a score to each of the recipient details for the respective recipient, the score indicating a likelihood of establishing communications with the recipient detail based on the recipient cluster and a time of day of the communication;

d. determine an order of the recipient details by which to attempt to establish communications between the sender and the respective recipient based on the scores; and e. attempt to establish communications between the sender and the respective recipient by selecting, in order, the recipient details for the recipient and attempting to establish communications with the recipient by the selected recipient details, and iteratively reverting to the next recipient details in the order until communications is established.

9. The method of claim 8, wherein the recipient details are stored in an address book accessible by the computing device.

10. The method of claim 8, wherein the intelligent redial application requests confirmation from the sender before establishing communications using each of the recipient details for the recipient.

11. The method of claim 8, wherein the recipient details are linked to social relationship contact data relating to other recipients.

12. The method of claim 11, wherein upon failure to establish communications with the recipient, the intelligent redial application reverts to recipient details for socially related other recipients for the recipient.

13. The method of claim 12, wherein the social relationship contact data is stored in levels for the recipient depending upon how closely related the social relationship contact is to the recipient, and wherein the processor is further configured to determine the order according to the levels for socially related other recipients.

14. The method of claim 8, wherein the intelligent redial application enables the sender to configure the order.

15. The system of claim 6, wherein the levels for the socially related other recipients for the recipient depend on a purpose of the communication.

16. The system of claim 15, wherein the purpose comprises any one of a business purpose or a social purpose.

17. The system of claim 5, wherein the recipient cluster further comprises time of day the social relationship contact may be in communication with the recipient.

18. The method of claim 13, wherein the levels for the socially related other recipients for the recipient depend on a purpose of the communication.

19. The method of claim 18, wherein the purpose comprises any one of a business purpose or a social purpose.

20. The method of claim 12, wherein the recipient cluster further comprises time of day the social relationship contact may be in communication with the recipient.

* * * * *